United States Patent
McCoy et al.

(10) Patent No.: US 9,950,624 B2
(45) Date of Patent: Apr. 24, 2018

(54) SYSTEM AND METHOD FOR PROVIDING A CONTROLLED POWER SUPPLY

(71) Applicants: SONY CORPORATION, Tokyo (JP); SONY NETWORK ENTERTAINMENT INTERNATIONAL LLC, Los Angeles, CA (US)

(72) Inventors: Charles McCoy, Coronado, CA (US); True Xiong, San Diego, CA (US); Prisciliano Flores, Spring Valley, CA (US); Yuqian Zhao, San Diego, CA (US)

(73) Assignees: SONY CORPORATION, Tokyo (JP); SONY NETWORK ENTERTAINMENT INTERNATIONAL LLC, Los Angeles, CA (US)

( * ) Notice: Subject to any disclaimer, the term of this patent is extended or adjusted under 35 U.S.C. 154(b) by 563 days.

(21) Appl. No.: 14/335,598

(22) Filed: Jul. 18, 2014

(65) Prior Publication Data
US 2016/0016474 A1 Jan. 21, 2016

(51) Int. Cl.
*B60L 1/00* (2006.01)
(52) U.S. Cl.
CPC .............. *B60L 1/006* (2013.01); *Y02T 90/16* (2013.01)
(58) Field of Classification Search
USPC ................................................ 307/9.1, 10.1
See application file for complete search history.

(56) References Cited

U.S. PATENT DOCUMENTS

| | | | |
|---|---|---|---|
| 7,912,625 B2 | 3/2011 | Cahoon | |
| 2008/0198018 A1* | 8/2008 | Hartley | H04M 1/0254 340/572.4 |
| 2010/0214084 A1* | 8/2010 | Haste, III | B60L 1/00 340/426.11 |
| 2011/0275321 A1 | 11/2011 | Zhou et al. | |
| 2014/0327408 A1* | 11/2014 | Ishii | B60L 11/123 320/135 |

FOREIGN PATENT DOCUMENTS

| | | | |
|---|---|---|---|
| DE | 102011078018 | * | 12/2012 |
| DE | 102011078018 A1 | | 12/2012 |

OTHER PUBLICATIONS

My BMW Remote-iOS, (http://content.bmwusa.com/microsite/connecteddrive_qa2/pdf/My_BMW_Remote_manual_iOS.pdf), Feb. 7, 2012, pp. 8.
Liz Campbell et al, IBM and sprint velocity drive connected car into the future, (http://www-03.ibm.com/press/us/en/pressrelease/41441.wssl), Jul. 10, 2013.

* cited by examiner

*Primary Examiner* — Hal Kaplan
*Assistant Examiner* — Xuan Ly
(74) *Attorney, Agent, or Firm* — Chip Law Group

(57) ABSTRACT

Various aspects of a system and a method for providing a controlled power supply are disclosed herein. The method, in a vehicle, comprises controlling a power supply unit coupled to an exterior surface of the vehicle. The power supply unit provides the power supply to an electronic device connected to the power supply unit.

21 Claims, 5 Drawing Sheets

SYSTEM AND METHOD FOR PROVIDING A CONTROLLED POWER SUPPLY

FIELD

Various embodiments of the disclosure relate to providing a controlled power supply. More specifically, various embodiments of the disclosure relate to providing a controlled power supply to an authenticated electronic device.

BACKGROUND

Recent technological advancements in the field of utility devices, such as a vehicle or a refrigerator, have made it possible to facilitate a high-level automation feature in such utility devices. The high-level automation feature may allow other portable electronic devices, such as a mobile phone, to remotely control various functions of the utility devices. Such portable electronic devices may be operated by users to control the various functions of the utility devices, such as a lock/unlock operation or an air-condition system of the vehicle.

In addition to the control of the various functions of the utility devices, the portable electronic devices may also perform certain device-centric functions. Examples of such device-centric functions may include, but are not limited to, placing/receiving voice calls, sending/receiving text messages, sending/receiving e-mails and/or running other data-network based mobile applications.

However, in such scenarios, when the portable electronic devices simultaneously perform both the utility device functions and the device-centric functions, the available power with the portable electronic devices may be rapidly consumed. An increase in the screen size of the portable electronic devices may also result in high power consumption. Such rapid consumption of power may result in an untimely discharge of the portable electronic device battery, which may be highly undesirable by the user.

Further limitations and disadvantages of conventional and traditional approaches will become apparent to one of skill in the art, through comparison of described systems with some aspects of the present disclosure as set forth in the remainder of the present application with reference to the drawings.

SUMMARY

A system and method are explained for providing a controlled power supply substantially as shown in, and/or described in connection with, at least one of the figures, as set forth more completely in the claims.

These and other features and advantages of the present disclosure may be appreciated from a review of the following detailed description of the present disclosure, along with the accompanying figures, in which like reference numerals refer to like parts throughout.

DETAILED DESCRIPTION

Various implementations may be found in a system and/or method for providing a controlled power supply. Exemplary aspects of the disclosure may comprise a method for providing a controlled power supply in a vehicle. The method may comprise controlling a power supply unit that is coupled to an exterior surface of the vehicle. The power supply unit may provide the power supply to the electronic device.

In an embodiment, the method may comprise providing the power supply to the electronic device when the electronic device is authenticated, based on pre-stored information. In an embodiment, the pre-stored information may correspond to one or more of user information, device information, and application information. In an embodiment, the user information may correspond to information associated with a user of the electronic device. In an embodiment, the application information may correspond to a second application executed on the electronic device.

In an embodiment, the authenticated electronic device may be operable to control an operation of the vehicle. In an embodiment, the operation may correspond to controlling one or more functions of the vehicle. In an embodiment, the one or more functions may comprise one or more of a locking operation, an unlocking operation, an ignition operation, or a configuration operation of user interface of the vehicle.

In an embodiment, the electronic device may comprise a customizable user interface that corresponds to a first application. In an embodiment, the first application may be executed by a processor in the vehicle. In an embodiment, the one or more operating buttons may be configured on the customizable user interface. In an embodiment, the one or more operating buttons may comprise one or more of a hardware button and a software button.

Another exemplary aspect of the disclosure may comprise a method for providing power supply in the vehicle. The method may comprise authenticating an electronic device. The method may further comprise controlling a power supply unit coupled to an exterior surface of the vehicle. The power supply unit may provide the power supply to the authenticated electronic device. In an embodiment, the method may comprise operating one or more functions of the vehicle using the authenticated electronic device. In an embodiment, the electronic device may be authenticated based on pre-stored information.

Figure 1:
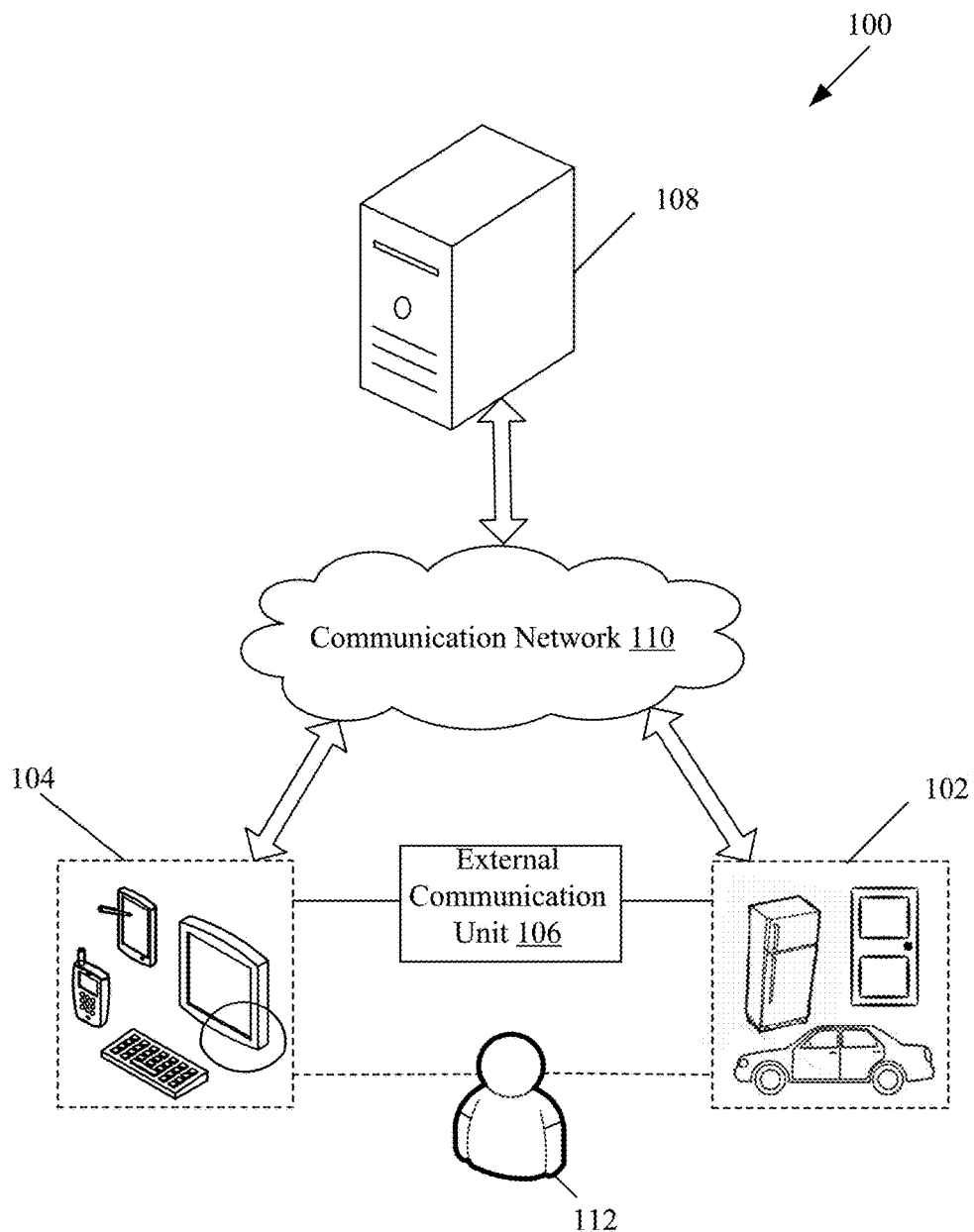
FIG. 1 is a block diagram illustrating a network environment for providing a controlled power supply, in accordance with an embodiment of the disclosure.

FIG. 1 is a block diagram illustrating a network environment, in accordance with an embodiment of the disclosure. With reference to FIG. 1, there is shown a network environment 100. The network environment 100 may comprise a first electronic device 102, a second electronic device 104, an external communication unit 106, an authentication server 108, a communication network 110, and a user 112.

The first electronic device 102 may be communicatively coupled to the second electronic device 104 and the authorization server 108, via the communication network 110. The first electronic device 102 may comprise the external communication unit 106, which is operable to provide the power supply to the second electronic device 104. The second electronic device 104 may be operated by the user 112, to control one or more functions of the first electronic device 102. Although, for simplicity, FIG. 1 shows only one first electronic device, such as the first electronic device 102, communicatively coupled to one second electronic device, such as the second electronic device 104, and operated by one user, such as the user 112, one skilled in the art may appreciate that the disclosed embodiments may be implemented for multiple first electronic devices communicatively coupled to multiple second electronic devices and operated by multiple users in the network environment 100, without limiting the scope of the disclosure.

The first electronic device 102 may comprise suitable logic, circuitry, interfaces, and/or code that may be operable to receive one or more commands from the second electronic device 104. Based on the one or more commands, one or more functions of the first electronic device 102 may be controlled by the user 112, via the second electronic device 104. Examples of the first electronic device 102 may include, but are not limited to, a consumer electronic (CE) device, a processor in a vehicle, and/or a controller of an electronic door. The one or more functions may correspond to a type of the first electronic device 102. For example, when the first electronic device 102 is a refrigerator, the one or more functions may include a temperature control operation to perform optimum cooling of food items. When the first electronic device 102 is the processor in the vehicle, the one or more functions may include an ignition operation of the vehicle. In an embodiment, the first electronic device 102 may be operable to execute a first application that may comprise a customizable user interface.

The second electronic device 104 may comprise suitable logic, circuitry, interfaces, and/or code that may be operable to control the one or more functions of the first electronic device 102. The second electronic device 104 may be operated by the user 112, to control the one or more functions of the first electronic device 102. The second electronic device 104 may be further operable to execute a set of applications, such as a second application, that may control the one or more functions of the first electronic device 102. The second electronic device 104 may comprise a battery, which provides the power supply to one or more circuits (not shown) in the second electronic device 104. In an embodiment, the battery may be internally connected to the second electronic device 104, via an internal interface. In an embodiment, the battery may be externally connected to the second electronic device 104, via an external interface. Examples of the second electronic device 104 may include, but are not limited to an electronic remote control apparatus, an electronic key, a mobile phone, a personal digital assistant (PDA), and/or a tablet.

The external communication unit 106 may comprise suitable logic, circuitry, interfaces, and/or code that may be operable to provide the power supply to the second electronic device 104. The power supply may be generated by a power supplying unit (not shown in FIG. 1). The generated power may be an Alternating Current (AC) power supply, or a Direct Current (DC) power supply. In an embodiment, the external communication unit 106 may be provided on an exterior surface of the first electronic device 102, such as on a door of a refrigerator, near the hood/trunk of a vehicle, or on the roof top of the vehicle. In an embodiment, the external communication unit 106 may correspond to an external socket connected to the first electronic device 102.

In an embodiment, the external communication unit 106 may be communicatively coupled to the second electronic device 104. In an embodiment, the external communication unit 106 may receive the first authentication information from the second electronic device 104, via the communication network 110. The first authentication information may correspond to identification information associated with the second electronic device 104. The first authentication information may include, but is not limited to, a user identifier of the user 112, a device identifier of the second electronic device 104, and/or an application identifier of the second application that is executed in the second electronic device 104. In an embodiment, the external communication unit 106 may receive second authentication information from the user 112. The second authentication information may include, but is not limited to a biometric identifier associated with the user 112 (such as, an image of the iris, or a fingerprint), a Personal Identification Number (PIN), and/or a set of user credentials of the user 112. The second authentication information may be received via one or more sensing devices, and/or one or more input/output (I/O) devices associated with the first electronic device 102.

The authentication server 108 may comprise suitable logic, circuitry, interfaces, and/or code that may be operable to communicate with the first electronic device 102, and the external communication unit 106, via the communication network 110. The authentication server 108 may be further operable to store master authentication information. The master authentication information may comprise the first authentication information associated with one or more second electronic devices, such as the second electronic device 104. The master authentication information may further comprise the second authentication information of the user 112, associated with the second electronic device 104. The authentication server 108 may be operable to compare the first authentication information received from the second electronic device 104 and the second authentication information received from the user 112, with the master authentication information. Based on the comparison, the authentication server 108 may be operable to authenticate the second electronic device 104. Based on the authentication, the second electronic device 104 may be operable to control the one or more functions of the first electronic device 102. Examples of the authentication server 108 may include, but are not limited to Sun Java Application Server®, Weblogic Server®, Apache Geronimo®, Bea Weblogic®, and/or IBM WebSphere®.

The communication network 110 may comprise a medium through which the first electronic device 102 may communicate with the second electronic device 104, and the authentication server 108. Examples of the communication network 110 may include, but are not limited to the Internet, a Wireless Fidelity (Wi-Fi) network, a Wireless Local Area Network (WLAN), a Local Area Network (LAN), a telephone line (POTS), a Near Field Communication (NFC), and/or a Metropolitan Area Network (MAN). The communication may be in accordance with various wired and wireless communication protocols, such as Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

In operation, the first electronic device 102 may receive metadata from one or more second electronic devices, such as the second electronic device 104. The first electronic device 102 may be operable to perform a preliminary identification of the second electronic device 104, based on a comparison of the received metadata with master metadata, pre-stored in a local memory of the first electronic device 102.

In an embodiment, based on an unsuccessful match between the received metadata and the pre-stored master metadata, the first electronic device 102 may not allow the second electronic device 104 to connect to the first electronic device 102. In an embodiment, based on a successful match between the received metadata and the pre-stored master metadata, the first electronic device 102 may allow the second electronic device 104 to connect to the first electronic device 102. In such an embodiment, the user 112 may control the one or more functions of the first electronic device 102, via the second electronic device 104. In an embodiment, the user 112 may allow another user (not shown in figure) to control the one or more functions of the first electronic device 102. In such an embodiment, the other user may control a set of functions from the one or more functions, controlled by the user 112.

In an embodiment, a first value of the status of the battery level of the second electronic device 104 may be less than a first threshold value, and thus, the second electronic device 104 may not be operable to transmit the metadata to the first electronic device 102. In such an embodiment, the second electronic device 104 may be connected to the first electronic device 102, via the external communication unit 106.

In an embodiment, the first value of the status of the battery level of the second electronic device 104 is greater than the first threshold value. In such an embodiment, the second electronic device 104 may be operable to transmit the first authentication information to the first electronic device 102, via the external communication unit 106. In an embodiment, the first electronic device 102 may compare the received first authentication information with the master authentication information pre-stored in the local memory. In an embodiment, based on a successful match between the first authentication information and the master authentication information, the second electronic device 104 may be authenticated. In an embodiment, based on an unsuccessful match between the received first authentication and the pre-stored master authentication information, the second electronic device 104 may not be authenticated.

In an embodiment, the first electronic device 102 may be operable to transmit the received first authentication information to the authentication server 108. The authentication server 108 may perform an authentication of the second electronic device 104, based on master authentication information. In an embodiment, the master authentication information may be pre-stored in a remote memory, associated with the authentication server 108. In an embodiment, the authentication server 108 may receive the first authentication information of the second electronic device 104 from the first electronic device 102, via the communication network 110.

In an embodiment, the authentication server 108 may compare the received first authentication information with the pre-stored master authentication information. Based on the comparison, the authentication server 108 may be operable to determine a comparison result and transmit the comparison result to first electronic device 102. In an embodiment, when the received comparison result indicates a successful match between the first authentication information and the pre-stored master authentication information, the second electronic device 104 may be authenticated. In an embodiment, when the received comparison result indicates an unsuccessful match between the first authentication information and the pre-stored master authentication information, the second electronic device 104 may not be authenticated.

In an embodiment, the first value of the status of the battery level of the second electronic device 104 may be less than the first threshold value, and the second electronic device 104 may not be operable to transmit the first authentication information to the first electronic device 102. In such an embodiment, the first electronic device 102 may be operable to receive a second authentication information from the user 112 associated with the second electronic device 104, via one or more I/O devices or one or more sensing devices.

In such an embodiment, the first electronic device 102 may be operable to compare the received second authentication information with the pre-stored master authentication information in the local memory of the first electronic device 102. In an embodiment, the first electronic device 102 may be operable to authenticate the second electronic device 104, based on a successful match between the first authentication information or the second authentication information, and the pre-stored master authentication information. In an embodiment, the first electronic device 102 may not authenticate the second electronic device 104, based on an unsuccessful match between the first authentication information or the second authentication information, and the pre-stored master authentication information.

In an embodiment, the first electronic device 102 may be operable to transmit the second authentication information to the authentication server 108, via the communication network 110. The authentication server 108 may compare the received second authentication information with the pre-stored master authentication information. Based on the comparison, the authentication server 108 may be operable to determine a comparison result and transmit the comparison result to first electronic device 102. In an embodiment, when the received comparison result indicates a successful match between the second authentication information and the pre-stored master authentication information, the second electronic device 104 may be authenticated. In an embodiment, when the received comparison result indicates an unsuccessful match between the first authentication information or the second authentication information, and the pre-stored master authentication information, the second electronic device 104 may not be authenticated.

In an embodiment, when the second electronic device 104 is authenticated, the external communication unit 106 may provide the power supply to the authenticated second electronic device 104. In an embodiment, when the second electronic device 104 is not authenticated, the external communication unit 106 may not provide the power supply to the second electronic device 104.

In an embodiment, the power supply may be provided to the second electronic device 104, till the status of the battery level of the second electronic device 104 indicates that the first value of the status of the battery level is greater than a second threshold value. In an embodiment, the external communication unit 106 may issue a notification for the user 112 to remove the second electronic device 104, when the first value of the status of the battery level is greater than the second threshold value. The notification may include, an alarm, or a glowing operation of a light emitting diode (LED) present on the external communication unit 106 and/or the second electronic device 104.

Figure 2:
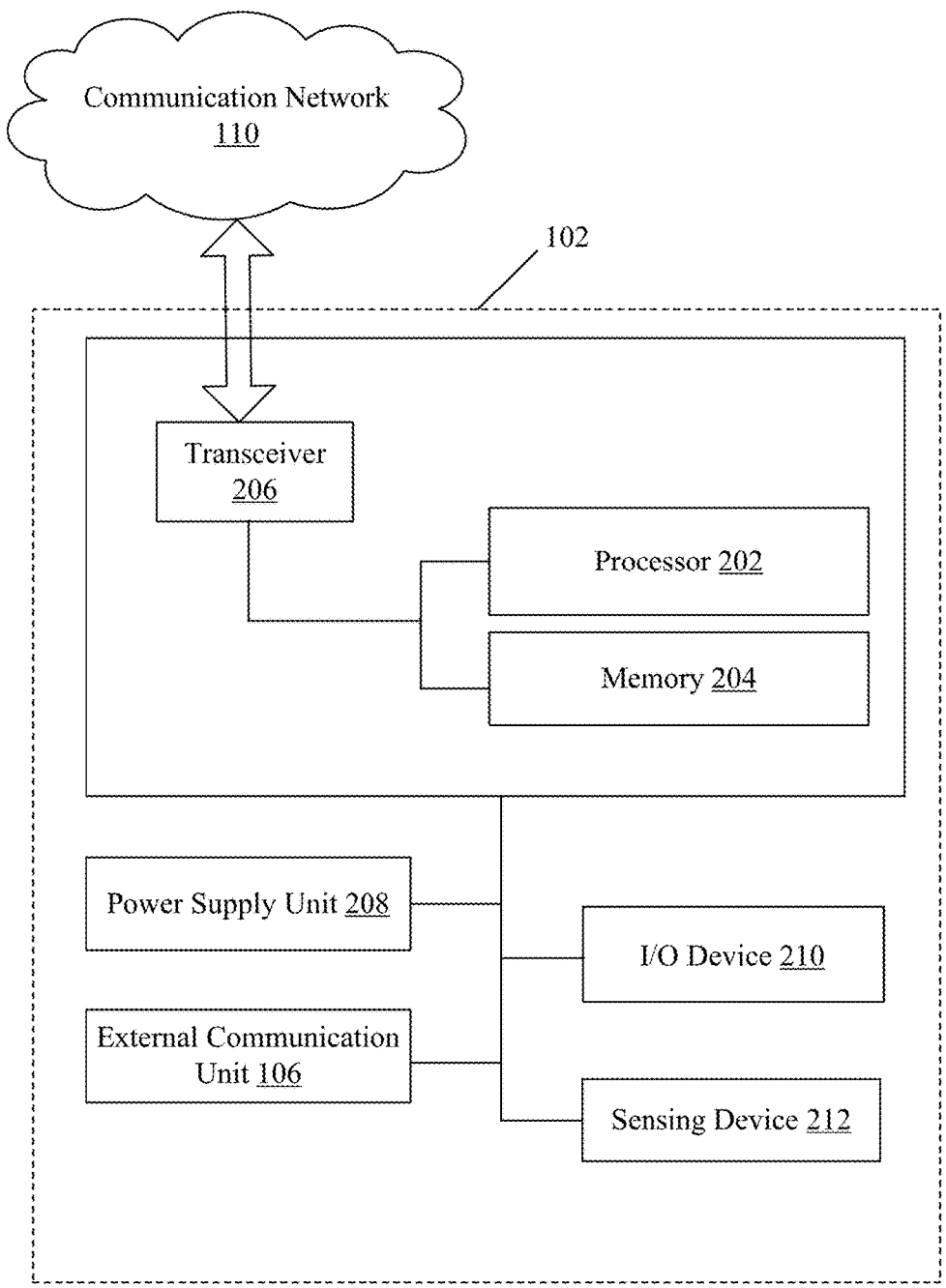
FIG. 2 is a block diagram illustrating a first electronic device, in accordance with an embodiment of the disclosure.

FIG. 2 is a block diagram illustrating a first electronic device, in accordance with an embodiment of the disclosure. FIG. 2 is explained in conjunction with elements from FIG. 1. With reference to FIG. 2, there is shown the first electronic device 102. The first electronic device 102 may comprise one or more processors, such as a processor 202, a memory 204, a transceiver 206, a power supply unit 208, one or more Input-Output (I/O) devices, such as an I/O device 210, one or more sensing devices, such as a sensing device 212, and the external communication unit 106. The processor 202 may be communicatively coupled to the memory 204, the transceiver 206, the power supply unit 208, the I/O device 210, the sensing device 212, and the external communication unit 106. Further, the transceiver 206 may be communicatively coupled to the second electronic device 104 and the authentication server 108, via the communication network 110. The functionality of the external communication unit 106 has already been described in detail in FIG. 1. With reference to FIG. 2, the external communication unit 106 may be operable to receive power supply from the power supply unit 208.

The processor 202 may comprise suitable logic, circuitry, interfaces, and/or code that may be operable to execute a set of instructions stored in the memory 204. In an embodiment, the set of instructions may correspond to the one or more functions of the first electronic device 102. In an embodiment, the processor 202 may be operable to receive one or more commands from the second electronic device 104. In an embodiment, the one or more commands may be provided by the user 112, via the second electronic device 104. The one or more commands may be associated with the set of instructions to control the one or more functions of the first electronic device 102. The processor 202 may be further operable to control the power supply unit 208 to provide a controlled power supply to the second electronic device 104. The processor 202 may be implemented based on a number of processor technologies known in the art. Examples of processor 202 may be an X86-based processor, a Reduced Instruction Set Computing (RISC) processor, an Application-Specific Integrated Circuit (ASIC) processor, a Complex Instruction Set Computing (CISC) processor, or any other processor.

The memory 204 may comprise suitable logic, circuitry, interfaces, and/or code that may be operable to store the set of instructions that correspond to the one or more functions of the first electronic device 102. The memory 204 may be further operable to store master metadata associated with the one or more second electronic devices, such as the second electronic device 104. The first electronic device 102 may identify the one or more second electronic devices, such as the second electronic device 104, based on the pre-stored master metadata. In an embodiment, the memory 204 may comprise pre-stored configuration information which may correspond to one or more configuration settings of the first electronic device 102. Such one or more configuration settings may correspond to the one or more functions of the first electronic device 102, which is controlled by the second electronic device 104.

In an embodiment, the memory 204 may comprise master metadata that correspond to one or more second electronic devices, such as the second electronic device 104. In an embodiment, the memory 204 may further comprise master authentication information that may comprise the first and the second authentication information. Based on master authentication information, the second electronic device 104 may be allowed or denied a supply of power, via the external communication unit 106. The memory 204 may be implemented based on, but is not limited to a Random Access Memory (RAM), a Read-Only Memory (ROM), a Hard Disk Drive (HDD), a storage server and/or a Secure Digital (SD) card.

The transceiver 206 may comprise suitable logic, circuitry, interfaces, and/or code that may be operable to communicate with the second electronic device 104, the external communication unit 106, and the authentication server 108, via various communication interfaces. The transceiver 206 may implement known technologies for supporting wired or wireless communication with the communication network 110. The transceiver 206 may include, but is not limited to an antenna, a radio frequency (RF) transceiver, one or more amplifiers, a tuner, one or more oscillators, a digital signal processor, a coder-decoder (CODEC) chipset, a subscriber identity module (SIM) card, and/or a memory. The transceiver 206 may communicate via wireless communication with networks, such as the Internet, an Intranet and/or a wireless network, such as a cellular telephone network, a wireless local area network (LAN) and/or a metropolitan area network (MAN), and other devices. The wireless communication may use any of a plurality of communication standards, protocols and technologies including, but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The power supply unit 208 may comprise suitable logic, circuitry, interfaces, and/or code that may be operable to provide the power supply to the external communication unit 106. The power supply unit 208 may be controlled by the processor 202 to provide the controlled power supply to the second electronic device 104. Examples of the power supply unit 208 may comprise, but are not limited to, an Alternating Current (AC) power supply unit, a Direct Current (DC) power supply unit, and/or a solar cell power supply unit.

The I/O device 210 may comprise various input and output devices that may be operable to connect to the processor 202. In an embodiment, I/O device 210 may be operable to receive the second authentication information from the user 112, associated with the second electronic device 104. Examples of the input devices may include, but are not limited to a keyboard, a mouse, a joystick, a touch screen, a microphone, a camera, a motion sensor, a light sensor, and/or a docking station. Examples of the output devices may include, but are not limited to, a display screen, and/or a speaker.

The sensing device 212 may comprise suitable logic, circuitry, and/or interfaces that may be operable to store a machine code and/or a computer program with at least one code section executable by the processor 202, to receive and respond to a signal when touched or activated. Such a signal may comprise a touch-based input, a touch-less input and/or an audio-based input. In an embodiment, the sensing device 212 may be operable receive the second authentication information from the user 112 associated with the second electronic device 104.

In an embodiment, the sensing device 212 may be operable to detect the touch-based input, (such as a button-press), and the touch-less input, (such as a gesture-based input), provided by the user 112. In an embodiment, the sensing device 212 may include a microphone operable to detect a voice pattern of the user 112, which corresponds to an audio-based input. In an embodiment, the sensing device 212 may include one or more sensors to detect a status of battery usage level and power supply status of the second electronic device 104. In an embodiment, the sensing device 212 may include one or more biometric sensors to track one or more biometric characteristics, such as movement of the eyes of the user 112.

In operation, the processor 202 may receive metadata from the one or more second electronic devices, such as the second electronic device 104. The processor 202 may be operable to perform a preliminary identification of the second electronic device 104, based on the received metadata. In an embodiment, the preliminary identification may be performed by the processor 202, based on a comparison of the received metadata with the master metadata, pre-stored in the memory 204. In an embodiment, based on a successful match between the received metadata and the pre-stored master metadata, the processor 202 may allow the second electronic device 104 to connect to the first electronic device 102. In an embodiment, based on an unsuccessful match between the received metadata and the pre-stored master metadata, the processor 202 may not allow the second electronic device 104 to connect to the first electronic device 102.

In an embodiment, the first value of the status of the battery level of the second electronic device 104 may be less than the first threshold value, and thus, the second electronic device 104 may not be operable to transmit the metadata to the processor 202. In such an embodiment, the second electronic device 104 may be connected to the processor 202, via the external communication unit 106. In such an embodiment, the external communication unit 106 may be operable to provide the power supply to the second electronic device 104, when the second electronic device 104 is connected to the processor 202, via the external communication unit 106.

In an embodiment, a first value of the status of the battery level of the second electronic device 104 may be greater than the first threshold value. In such an embodiment, the second electronic device 104 may be operable to transmit the first authentication information to the processor 202, via the external communication unit 106. In an embodiment, the processor 202 may compare the received first authentication information with the pre-stored master authentication information in the memory 204. In an embodiment, based on the comparison, the processor 202 may be operable to determine the authentication of the second electronic device 104 to receive power from the external communication unit 106. In an embodiment, based on a successful match between the first authentication information and the master authentication information pre-stored in the memory 204, the processor 202 may authenticate the second electronic device 104.

In an embodiment, the processor 202 may be operable to transmit the received first authentication information to the authentication server 108, via the communication network 110. The transmitted first authentication information may be compared with the pre-stored master authentication information by the authentication server 108. Based on the comparison, a result may be determined and transmitted to processor 202 by the authentication server 108, via the communication network 110. In an embodiment, when the received comparison result indicates a successful match between the first authentication information and the pre-stored master authentication information, the processor 202 may authenticate the second electronic device 104. In an embodiment, when the received comparison result indicates an unsuccessful match between the first authentication information and the pre-stored master authentication information, the processor 202 may not authenticate the second electronic device 104.

In an embodiment, the first value of the status of the battery level of the second electronic device 104 may be less than a first threshold value. In such an embodiment, the second electronic device 104 may not be operable to transmit the first authentication information to the external communication unit 106. In such an embodiment, the user 112, associated with the connected second electronic device 104, may provide the second authentication information, via the I/O device 210 and/or the sensing device 212. In an embodiment, the processor 202 may compare the received second authentication information with the pre-stored master authentication information. In an embodiment, based on a successful match between the second authentication information and the master authentication information pre-stored in the memory 204, the processor 202 may authenticate the second electronic device 104. In an embodiment, based on an unsuccessful match between the second authentication information and the master authentication information pre-stored in the memory 204, the processor 202 may not authenticate the second electronic device 104. In an embodiment, the external communication unit 106 may be operable to provide the power supply to the second electronic device 104, based on the successful match between the first authentication information or the second authentication information, and the pre-stored master authentication information.

In an embodiment, when the second electronic device 104 is authenticated, the processor 202 may be operable to provide the power supply to the authenticated second electronic device 104, via the external communication unit 106. In an embodiment, the processor 202 may provide an instruction to the power supply unit 208 to provide the power supply to the authenticated second electronic device 104, via the external communication unit 106. In an embodiment, the processor 202 may receive metadata from the second electronic device 104. The processor 202 may be operable to perform the preliminary identification of the second electronic device 104, based on a comparison of the received metadata with the master metadata, pre-stored in the memory 204. In an embodiment, based on a successful match between the received metadata and the pre-stored master metadata, the processor 202 may allow the second electronic device 104 to connect to the first electronic device 102. In an embodiment, the processor 202 may be operable to receive one or more commands from the user 112, via the second electronic device 104. The one or more commands may control the one or more functions of the first electronic device 102. In an embodiment, when the second electronic device 104 is not authenticated, the processor 202 may not provide the power supply to the unauthenticated second electronic device 104, via the external communication unit 106.

Figure 3:
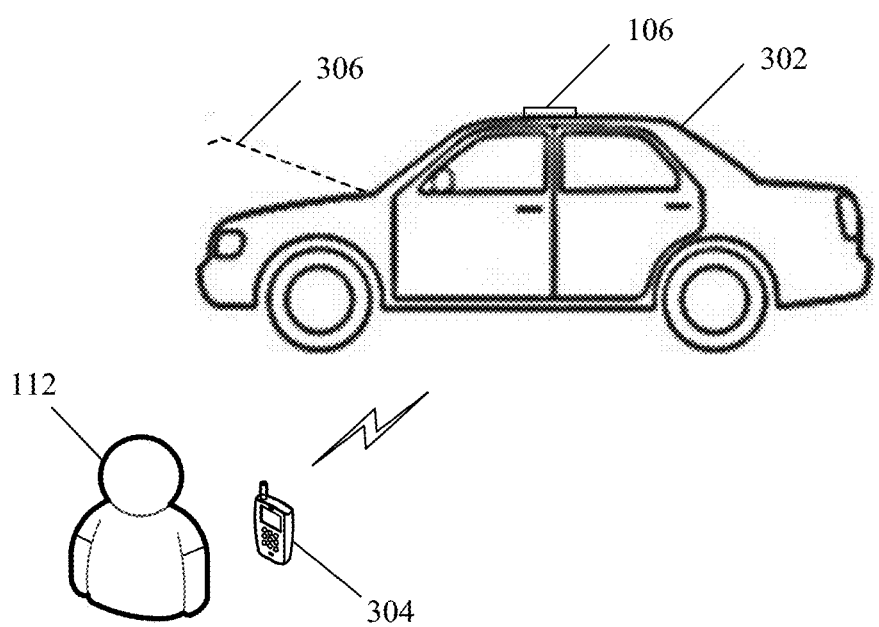
FIG. 3 is a block diagram illustrating an exemplary scenario for providing a controlled power supply, in accordance with an embodiment of the disclosure.

FIG. 3 is a block diagram illustrating an exemplary scenario, in accordance with an embodiment of the disclosure. FIG. 3 is explained in conjunction with elements from FIG. 1 and FIG. 2. With reference to FIG. 3, there is shown an exemplary first electronic device 102, such as a processor 202 in a vehicle 302, associated with an exemplary second electronic device 104, such as a mobile phone 304. A hood 306 may be positioned towards the front portion of the vehicle 302.

With reference to FIG. 3, in a first exemplary embodiment, the processor 202 in the vehicle 302 may be operable to receive metadata from the mobile phone 304. In an embodiment, the processor 202 in the vehicle 302 may perform a preliminary identification of the mobile phone 304, based on a comparison of the received metadata and the pre-stored master metadata. In an embodiment, based on an unsuccessful match, the mobile phone 304 may be not identified by the processor 202. In such an embodiment, a notification may be generated by the processor 202. In an embodiment the notification may be an error message that may be displayed on the mobile phone 304. In an embodiment, the notification may be an alert sound generated by the I/O device 212, such as a speaker.

In an embodiment, based on a successful match between the received metadata and the pre-stored master metadata, the processor 202 may allow the mobile phone 304 to connect to the vehicle 302. In an embodiment, based on the successful match between the received metadata and the pre-stored master metadata, the user 112 may control the one or more functions of the vehicle 302, via the mobile phone 304. For example, the user 112 may control a function, such as an operation to open the hood 306, of the vehicle 302. In an embodiment, the mobile phone 304 may be operable to execute a second application, which is configured to control the one or more functions of the vehicle 302. In an embodiment, the user 112 may access the first application, via a user interface presented on a display screen of the mobile phone 304. In an embodiment, the user 112 may access the second application, via another user interface presented on a display screen of the mobile phone 304. In an embodiment, the first application may be stored in a local storage of the vehicle 302. In such an embodiment, an on-board computer present in the vehicle 302 may execute the first application.

In an embodiment, the user interface may comprise one or more buttons that may be customized by the user 112. In an embodiment, the one or more buttons may correspond to the one or more functions of the first electronic device 102. The one or more buttons may comprise a hardware button and/or a software button. In an embodiment, the customization of the user interface may comprise, but is not limited to, an addition of one or more new buttons, a removal of one or more buttons, and/or a configuration of the one or more functions associated with the one or more buttons.

In an embodiment, the first value of the status of the battery level of the mobile phone 304 may be less than the first threshold value, and thus, the mobile phone 304 may not be operable to transmit the metadata to the processor 202 in the vehicle 302. In such an embodiment, the mobile phone 304 may be connected to the processor 202 in the vehicle 302, via the external communication unit 106. In such an embodiment, the external communication unit 106 of the vehicle 302 may be operable to provide the power supply to the mobile phone 304, when the mobile phone 304 is connected to the processor 202 in the vehicle 302, via the external communication unit 106.

In an embodiment, when the first value of the status of the battery level of the mobile phone 304 is greater than the first threshold value, the processor 202 in the vehicle 302 may receive the first authentication information from the mobile phone 304, via the external communication unit 106. The first authentication information may correspond to a user identifier, such as a user name of the user 112, a user PIN number, a device identifier, such as, a device ID of the mobile phone 304 and/or a Subscriber Identity Module (SIM) number of the mobile phone 304, and/or an application identifier of an application executed in the mobile phone 304.

In an embodiment, the processor 202 may compare the received first authentication information with the master authentication information, pre-stored in the memory 204. In an embodiment, the processor 202 may be operable to authenticate the mobile phone 304, based on a successful match between the first authentication information and the pre-stored master authentication information. In an embodiment, the processor 202 may not authenticate the mobile phone 304, based on an unsuccessful match between the first authentication information and the pre-stored master authentication information.

In an embodiment, when the first level of the status of the battery level is less than the first threshold value, the mobile phone 304 may not be operable to transmit the first authentication information to the processor 202 in the vehicle 302. In such an embodiment, the user 112, associated with the mobile phone 304, may provide the second authentication information, via the I/O device 210 or the sensing device 212. In an embodiment, the processor 202 may compare the received second authentication information with the master authentication information pre-stored in the memory 204.

In an embodiment, the processor 202 may compare the received second authentication information with the master authentication information, pre-stored in the memory 204. In an embodiment, the processor 202 may be operable to authenticate the mobile phone 304, based on a successful match between the second authentication information and the pre-stored master authentication information. In an embodiment, the processor 202 may not authenticate the mobile phone 304, based on an unsuccessful match between the second authentication information and the pre-stored master authentication information.

In an embodiment, when the mobile device 304 is authenticated, the processor 202 may be operable to provide the power supply to the authenticated mobile phone 304, via the external communication unit 106. In an embodiment, the processor 202 may provide an instruction to the power supply unit 208 to provide the power supply to the authenticated mobile phone 304, via the external communication unit 106. In such an embodiment, the mobile phone 304 may receive power supply, such that the first value of the status of the battery level exceeds the first threshold value.

In an embodiment, when the first value of the status of the battery level exceeds the first threshold value, the processor 202 may receive metadata from the mobile device 304. The processor 202 may be operable to perform the preliminary identification of the mobile device 304, based on a comparison of the received metadata with the master metadata, pre-stored in the memory 204. In an embodiment, based on a successful match between the received metadata and the pre-stored master metadata, the processor 202 may allow the mobile device 304 to connect to the vehicle 302. In an embodiment, the processor 202 may be operable to receive one or more commands from the user 112, via the mobile device 304. The one or more commands may control the one or more functions of the 302. In an embodiment, when the mobile device 304 is not authenticated, the processor 202 may not provide the power supply to the unauthenticated mobile device 304, via the external communication unit 106.

In an embodiment, the power supply may be provided to the mobile phone 304, till the status of the battery level of the mobile phone 304 indicates that the first value of the status of the battery level is greater than the second threshold value. In an embodiment, the external communication unit 106 may issue a notification for the user 112 to remove the mobile phone 304, when the first value of the status of the battery level is greater than the second threshold value. The notification may include, an alarm, or a glowing operation of a light emitting diode (LED) present on the external communication unit 106 and/or the mobile phone 304.

Figure 4:
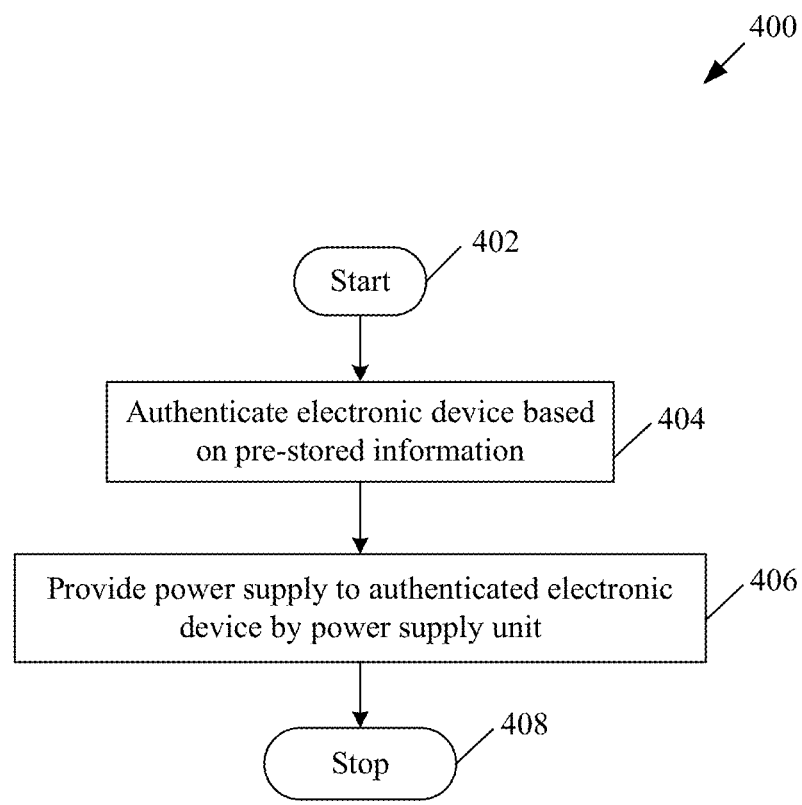
FIG. 4 is a flow chart illustrating a method for providing a controlled power supply, in accordance with an embodiment of the disclosure.

FIG. 4 is a flow chart illustrating a method for providing a controlled power supply, in accordance with an embodiment of the disclosure. FIG. 4 is described in conjunction with elements of FIG. 1, FIGS. 2, and 3. The method 400 may be implemented in the first electronic device 102, communicatively coupled to the second electronic device 104, the external communication unit 106, and the authentication server 108, via the communication network 110. The method 400 begins at step 402 and proceeds to step 404. At step 404, an electronic device, such as the mobile phone 304, may be authenticated, based on pre-stored information, such as the pre-stored master authentication information. At step 406, the power supply may be provided to the authenticated electronic device by the power supply unit 208, coupled to an exterior surface of the vehicle 302. The control passes to end step 408.

Figure 5:
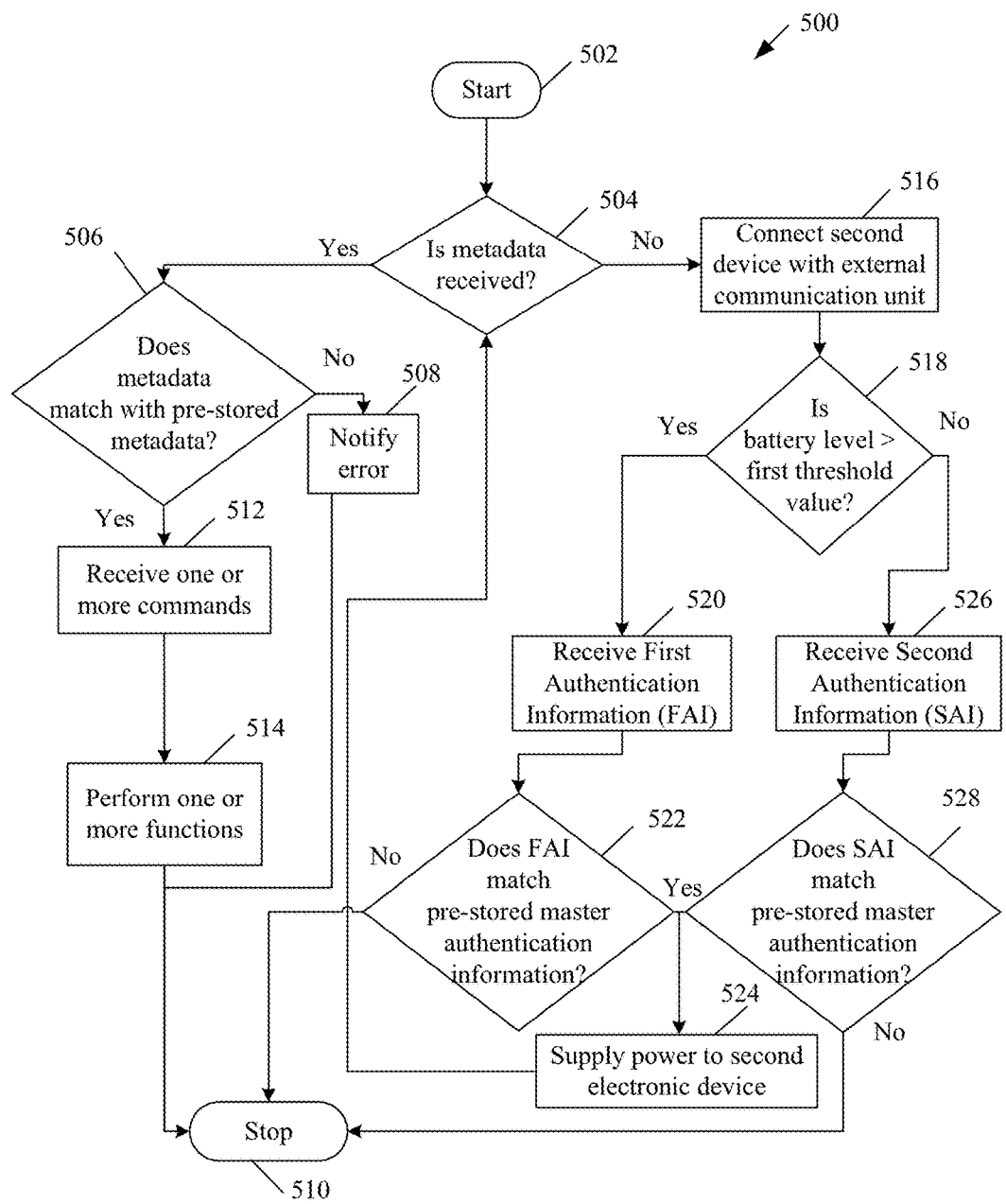
FIG. 5 is another flow chart illustrating a method for providing a controlled power supply, in accordance with an embodiment of the disclosure.

FIG. 5 is another flowchart illustrating a method for providing a controlled power supply, in accordance with an embodiment of the disclosure. FIG. 5 is described in conjunction with elements of FIG. 1 and FIG. 2. The method 500 may be implemented in the first electronic device 102, communicatively coupled to the second electronic device 104, the external communication unit 106, and the authentication server 108, via the communication network 110. The method 500 begins at step 502 and proceeds to step 504. At step 504, it may be determined whether metadata is received by the processor 202, from the second electronic device 104, via the communication network 110. In instances where it is determined that the metadata is received by the processor 202, the control moves to step 506. At step 506, it may be determined whether the received metadata match with the master metadata pre-stored in the memory 204.

In instances where it is determined that received metadata does not to match with the pre-stored master metadata, the control passes to step 508. At step 508, the second electronic device 104 may be notified of an error and the control passes to end step 510. In instances where it is determined that the received metadata match the pre-stored master metadata, the second electronic device 104 is identified by the first electronic device 102. The control moves to step 512. At step 512, one or more commands may be received by the processor 202, via the second electronic device 104. At step 514, one or more functions of the first electronic device 102 may be performed based on the one or more commands received from the second electronic device 104. The control passes to end step 510.

In instances where it is determined that the metadata is not received by the processor 202, the control moves to step 516. At step 516, the second electronic device 104 may be connected to the first electronic device 102, via the external communication unit 106. At step 518, it may be determined whether the first value of the status of the battery level is greater than the first threshold value.

In instances where the first value of the status of the battery level is greater than the first threshold value, the control moves to step 520. At step 520, the first authentication information may be received by the external communication unit 106 from the second electronic device 104. At step 522, it may be determined whether the first authentication information match the master authentication information pre-stored in the memory 204.

In instances where it is determined that received first authentication information match the pre-stored master authentication information, the control moves to step 524. At step 524, the power may be supplied to the battery of the second electronic device 104, and control moves to the step 504. In instances where it is determined that received first authentication information does not match with the pre-stored master authentication information, the control passes to end step 510.

In instances where the first value of the status of the battery level is less than the first threshold value, the control moves to step 526. At step 526, second authentication information may be received from the user 112, via the I/O device 210 and/or the sensing device 212. At step 528, it may be determined whether the second authentication information match with the pre-stored authentication information stored in the memory 204.

In instances where it is determined that received second authentication information match with the pre-stored master authentication information, the control moves to step 524. At step 524, the power may be supplied to the battery of the second electronic device 104, and control moves to the step 504. In instances where it is determined that received second authentication information fails to match with the pre-stored master authentication information, the control passes to end step 510.

In accordance with the present disclosure, a system for providing power supply is presented. Exemplary aspects of the disclosure may comprise one or more processors, such as the processor 202 (FIG. 2), in the first electronic device 102 (FIG. 1). The processor 202 may be operable to control the power supply unit 208 (FIG. 2). The power supply unit 208 is coupled to an exterior surface of the first electronic device 102. The power supply unit 208 may provide the power supply to the second electronic device 104 (FIG. 1). In an embodiment, the power supply unit 208 may be operable to provide the power supply to the second electronic device 104 when the second electronic device 104 is authenticated, based on a pre-stored information.

Another exemplary aspect of the disclosure may comprise a system for providing power supply. Exemplary aspects of the disclosure may comprise one or more processors, such as the processor 202, in the vehicle 302. The processor 202 may be operable to authenticate an electronic communication device and control the power supply unit 208 coupled to an exterior surface of the vehicle 302. The power supply unit 208 may provide the power supply to the authenticated electronic communication device.

Various embodiments of the disclosure may provide a non-transitory computer readable medium and/or storage medium, and/or a non-transitory machine readable medium and/or storage medium having stored thereon, a machine code and/or a computer program having at least one code section executable by a machine and/or a computer for providing power supply. The at least one code section in a first electronic device may cause the machine and/or computer to perform the steps comprising controlling the power supply unit, coupled to an exterior surface of the first electronic device. The power supply unit may provide the power supply to the second electronic device.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having information processing capability to perform a particular function either directly, or after either or both of the following a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for providing power, said method comprising:
    in a processor in a vehicle:
        selecting a type of authentication scheme to authenticate an electronic device, wherein said selection of said type of authentication scheme is based on a battery level of said electronic device, wherein said electronic device is external to said vehicle; and
        controlling, based on said selection of said type of authentication scheme, supply of power from a power supply unit to said electronic device, wherein said power supply unit is coupled to an exterior surface of said vehicle.

2. The method of claim 1, wherein said electronic device comprises a customizable user interface corresponding to a first application, wherein said first application is executed on said electronic device.

3. The method of claim 2, wherein at least one operating button is configured on said customizable user interface.

4. The method of claim 3, wherein said at least one operating button comprises at least one of a hardware button or a software button.

5. The method of claim 1, wherein said supply of power to said electronic device is based on authentication of said electronic device based on stored information.

6. The method of claim 5, wherein said stored information corresponds to at least one of user information, device information, or application information.

7. The method of claim 6, wherein said user information corresponds to information associated with a user of said electronic device.

8. The method of claim 6, wherein said application information corresponds to a second application executed on said electronic device.

9. The method of claim 5, wherein said authenticated electronic device is operable to control an operation of said vehicle.

10. The method of claim 9, wherein said operation corresponds to controlling at least one function of said vehicle.

11. The method of claim 10, wherein said at least one function comprises a locking operation, an unlocking operation, an ignition operation, or a configuration operation of user interface of said vehicle.

12. A method for providing power, said method comprising:
    in a processor in a vehicle:
        selecting a type of authentication scheme to authenticate an electronic device, wherein said selection of said type of authentication scheme is based on a battery level of said electronic device, wherein said electronic device is external to said vehicle;
        authenticating said electronic device based on said selected type of authentication scheme; and
        controlling supply of power from a power supply unit to said electronic device based on said authentication, wherein said power supply unit is coupled to an exterior surface of said vehicle.

13. The method of claim 12, further comprising operating at least one function of said vehicle based on said authenticated said electronic device.

14. The method of claim 12, wherein said electronic device is authenticated based on stored information.

15. The method of claim 14, wherein said stored information corresponds to at least one of user information, device information, or application information.

16. A system, comprising:
    a processor in a vehicle, wherein said processor is operable to:
        select a type of authentication scheme to authenticate an electronic device, wherein said selection of said type of authentication scheme is based on a battery level of said electronic device, wherein said electronic device is external to said vehicle; and
        control, based on said selection of said type of authentication scheme, supply of power from a power supply unit to said electronic device, wherein said power supply unit is coupled to an exterior surface of said vehicle.

17. A system, comprising:
    a processor in a vehicle, wherein said processor is operable to:
        select a type of authentication scheme to authenticate an electronic communication device, wherein said selection of said type of authentication scheme is based on a battery level of said electronic communication device, wherein said electronic communication device is external to said vehicle;
        authenticate said electronic communication device based on said selected type of authentication scheme; and
        control supply of power from a power supply unit to said electronic communication device based on said authentication, wherein said power supply unit is coupled to an exterior surface of said vehicle.

18. The system of claim 17, wherein said electronic communication device is authenticated based on stored information.

19. The system of claim 18, wherein said stored information corresponds to at least one of user information, device information, or application information.

20. The system of claim 19, wherein said user information corresponds to information associated with a user of said electronic communication device.

21. The system of claim 19, wherein said application information corresponds to an application executed on said electronic communication device.

* * * * *